United States Patent [19]

Jost

[11] 4,224,151
[45] Sep. 23, 1980

[54] PREVENTING SCALE DEPOSITION FROM GEOTHERMAL FLUIDS

[75] Inventor: John W. Jost, Anaheim, Calif.

[73] Assignee: Union Oil Company of California, Brea, Calif.

[21] Appl. No.: 968,480

[22] Filed: Dec. 11, 1978

Related U.S. Application Data

[63] Continuation-in-part of Ser. No. 875,383, Feb. 6, 1978, abandoned.

[51] Int. Cl.$^2$ .............................................. C02B 5/02
[52] U.S. Cl. .................................. 210/696; 166/267; 210/758; 423/224
[58] Field of Search .................... 166/265–267; 210/15, 50, 57, 58, 59, 63 R; 423/224, 514

[56] References Cited

U.S. PATENT DOCUMENTS

| | | | |
|---|---|---|---|
| 3,963,611 | 6/1976 | Dardenne-Ankringa | 210/63 R |
| 4,044,830 | 8/1977 | Van Huisen | 166/267 |

OTHER PUBLICATIONS

Wilson et al., "Removal of Hydrogen Sulfide from Simulated Geothermal Brines with $O_2$", U.S. ERDA, 4/1977, pp. 1–79.

Martin et al., "New Column Removes Sulfide with Air", *Hydrocarbon Processing*, May 1962, pp. 149–152.
Jackson et al., "Possibilities for Controlling Heavy Metal Sulfides in Scale from Geothermal Brines", Livermore Lab., U. of Cal., 1/1976, pp. 1–14.
Wilson, Environmental Aspects of Multi-Purpose Devel. of Geothermal Resources, AICHE Symposium Series, No. 136, 1974, pp. 782–787.

*Primary Examiner*—Charles N. Hart
*Assistant Examiner*—Peter A. Hruskoci
*Attorney, Agent, or Firm*—Dean Sandford; Daniel R. Farrell

[57] ABSTRACT

A method for preventing the deposition of sulfide and/or sulfate scale during the production of a hot two-phase geothermal fluid which contains hydrogen sulfide, barium heavy and/or transition metals, and at least a critical minimum amount of calcium in solution. Gaseous oxygen is injected into the geothermal fluid at a critical rate to selectively oxidize the hydrogen sulfide to intermediate sulfide oxidation products, such as thiosulfates. Thereafter the geothermal fluid is separated into gaseous and liquid phases. Where iron is present in the geothermal fluid, the degree of turbulence induced during the oxidation step is selectively controlled in order to prevent the deposition of iron pyrites.

14 Claims, 1 Drawing Figure

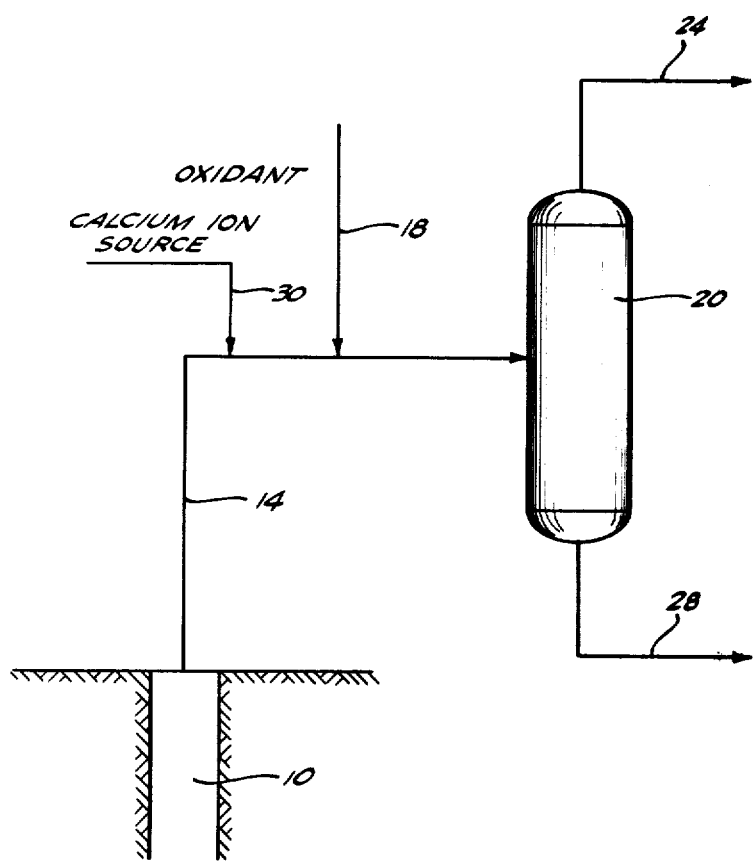

PREVENTING SCALE DEPOSITION FROM GEOTHERMAL FLUIDS

RELATED APPLICATION

This is a continuation-in-part of application Ser. No. 875,383, filed Feb. 6, 1978 now abandoned.

BACKGROUND OF THE INVENTION

This invention relates to the treatment of hot geothermal fluids containing hydrogen sulfide, and more particularly to the oxidation of hydrogen sulfide present in a two-phase geothermal fluid in order to prevent scale deposition therefrom.

As conventional hydrocarbon fuel reserves have been depleted, a worldwide emphasis has been placed on developing alternative energy resources, such as geothermal energy. Geothermal energy is generated by producing steam, hot water or hot aqueous brines from a subterranean geothermal reservoir and utilizing the produced fluid in conjunction with surface equipment, such as turbines and heat exchangers, to derive useful energy therefrom.

Most hot aqueous geothermal brines which are produced from subterranean reservoirs contain substantial quantities of dissolved heavy and/or transition metal ions and also hydrogen sulfide. As the geothermal brine is produced via wells communicating with a subterranean geothermal reservoir, the pressure is reduced and the brine begins to boil or flash to form a gaseous phase which causes the temperature of the fluid to drop. Concomitant with this pressure and temperature drop, carbon dioxide evolves from the brine thereby shifting the equilibria existing therein and causing the disassociation of divalent sulfide ions from hydrogen sulfide. These divalent sulfide ions react with the heavy and/or transition metal ions to form heavy and/or transition metal sulfide precipitates which cause fouling of the process piping and equipment.

In view of this, several techniques for reducing the formation of insoluble metal sulfide precipitates in geothermal brine and the resultant scaling have been proposed. One such technique is to oxidize the sulfides present in the brine to more soluble sulfur species. It has been suggested to add oxygen to low salinity brines just prior to entry of the brine into the first surface flash vessel. In this manner, sulfides in the brine would be converted mostly to sulfate with some elemental sulfur being formed.

In a 1974 report on a series of laboratory experiments conducted with a simulated brine, one investigator disclosed that the rate of sulfide conversion to sulfate was very high upon the addition of 6 to 10 moles of oxygen per mole of sulfide present in the simulated brine. The simulated brine did not contain barium and therefore the effect of scaling due to the formation of barium sulfate was not reported.

Another investigator proposed in a 1976 report that the use of lesser amounts of oxygen, i.e., less than the stoichiometric amount of oxygen required to convert the sulfide to sulfate, may result in only a partial oxidation of the sulfide to, for example, elemental sulfur thereby avoiding the formation of sulfate scales, such as barium sulfate. The concept had not been tested in the laboratory or in the field.

However, a 1977 report by the first-mentioned investigator presented the results of additional laboratory tests which established that the hoped-for partial oxidation was not achieved when less than stoichiometric amounts of oxygen, such as 0.5 to 2.0 moles of oxygen per mole of hydrogen sulfide, were injected into the simulated brine. This report disclosed that oxidation of the sulfide was complete at molar ratios of 1.25:1 and 1.5:1 forming mostly sulfate species, such as more than 80 percent sulfates.

Accordingly, the prior art teaches that the partial oxidation of barium-containing geothermal fluids in order to prevent the deposition of sulfide and/or sulfate scales is not possible even at substoichiometric oxygen to hydrogen sulfide molar ratios. A need exists for a method which will oxidize sulfides present in the geothermal fluid so as to prevent sulfide scale deposition but which at the same time does not deposit significant amounts of sulfate scale.

Accordingly, it is an object of the present invention to provide a process for oxidizing sulfides present in a two-phase geothermal fluid in a manner which substantially eliminates any attendant precipitation, scaling and corrosion problems.

Another object of the present invention is to provide an economical and efficient process for oxidizing sulfides present in geothermal brines in order to prevent the deposition of sulfide and/or sulfate scale.

A still further object of the present invention is to provide a process for oxidizing sulfides present in geothermal brines to an intermediate oxidation state less than sulfate in order to substantially eliminate barium sulfate deposition.

These and other objects and advantages of the invention will be apparent from the following detailed description and drawing.

SUMMARY OF THE INVENTION

Briefly, the invention provides a method for preventing the formation and precipitation of sulfide and/or sulfate scales from a hot two-phase geothermal fluid which contains hydrogen sulfide, barium, heavy and/or transition metals, and at least a critical minimum calcium concentration. In the method, the geothermal fluid is produced from a subterranean geothermal reservoir through a well, and gaseous oxygen is injected into the geothermal fluid in order to provide therein an oxygen to hydrogen sulfide molar ratio between about 0.75 and about 1.75, preferably between about 1 and about 1.5. The presence of the critical amount of calcium and the use of the critical amount of oxygen result in the oxidation of the hydrogen sulfide to sulfur and/or water-soluble sulfide oxidation products wherein the sulfur has a valence less than plus six, such as thiosulfate and bisulfite, thereby avoiding the formation of any significant amount of sulfate.

Where the geothermal fluid also contains iron in solution, the amount of turbulence induced during injection and mixing of the oxygen with the two-phase fluid during the oxidation step is also critical. Too little mixing results in less than the desired amount of hydrogen sulfide oxidation and hence the deposition of sulfide scale, and too much mixing results in the deposition of iron pyrites.

The method of this invention provides a simple, inexpensive and effective method for substantially eliminating sulfide and/or sulfate scale deposition during the production of a hot geothermal fluid. Moreover, the method prevents scale deposition without causing any significant loss in the temperature or pressure of the treated geothermal fluid. Accordingly, the method provides a hot, high pressure geothermal brine which is substantially free of sulfide and/or sulfate scale-forming species and suitable for use in steam generation, or the like.

BRIEF DESCRIPTION OF THE DRAWING

The invention will be more readily understood by reference to the accompanying drawing which depicts a schematic flow diagram of the process of this invention.

DETAILED DESCRIPTION OF THE INVENTION

The present invention relates to a process for oxidizing sulfides present in produced geothermal fluids. The present invention further relates to a process for substantially eliminating any scale deposition or corrosion accompanying the oxidation of sulfides present in geothermal brines.

Referring now to the drawing, a geothermal fluid is produced as a two-phase fluid from a subterranean geothermal reservoir via wells communicating therewith, such as well 10. This geothermal fluid is usually produced at a temperature of, for example, at least 300° F. The liquid phase of the geothermal fluid, i.e., the geothermal brine, contains substantial quantities of heavy and/or transition metal ions such as silver, copper, lead, zinc, manganese and iron, dissolved in solution and may also contain large amounts of silica in solution. Also, the fluid contains relatively large amounts of non-condensible gases, such as hydrogen sulfide, mostly in the gaseous phase. An example of a typical composition of the liquid phase of a produced geothermal fluid is set forth in Table 1.

TABLE 1

| Constituent | Concentration ppm | Constituent | Concentration ppm |
|---|---|---|---|
| Sodium | 50,400 | Iodine | 18 |
| Potassium | 17,500 | Sulfide | 16 |
| Lithium | 215 | Boron | 390 |
| Rubidium | 137 | Iron (Ferrous) | 2,090 |
| Cesium | 16 | Manganese | 1,560 |
| Ammonia | 409 | Silver | 0.8 |
| Calcium | 28,000 | Copper | 8 |
| Magnesium | 54 | Lead | 84 |
| Barium | 235 | Zinc | 790 |
| Strontium | 609 | Arsenic | 12 |
| Chlorine | 155,000 | Antimony | 0.4 |
| Fluorine | 15 | $CO_2$ as $HCO_3$ | 150 |
| Bromine | 120 | Silica ($SiO_2$) | 400 |

As employed throughout this specification, the terms "heavy metals" and "heavy metal ions" are meant to include metals having a density greater than 4 and the ions thereof. Examples of heavy metals are manganese, iron, copper, silver, lead and zinc. "Transition metals" and "transition metal ions" as used throughout the specification denote elements having partially filled d and f electron orbital shells and the ions thereof. Specifically, "transition metals" and "transition metal ions" are intended to include elements 21 through 29 (scandium through copper), 39 through 47 (yttrium through silver), 57 through 79 (lanthanum through gold), and all known elements from 89 (actinum) and above and the ions thereof. Examples of transition metals commonly found in geothermal brine include manganese, iron, copper and silver. As is readily apparent, "transition metals" and "heavy metals" are not mutually exclusive terms.

The geothermal fluid is produced from subterranean geothermal reservoirs via wells, such as well 10, to the surface where prior to entry into the first wellhead separator 20, the sulfides in the geothermal fluid are oxidized as hereinafter described. The geothermal fluid is then transported via conduit 14 to separator 20 wherein the gaseous phase, i.e. non-condensible gases and steam, is separated from the brine. The non-condensible gases and steam are drawn off near the top of the separator via conduit 24 and are either discharged directly to the atmosphere or conveyed to a suitable facility for the recovery of energy therefrom. The brine exits near the bottom of separator 20 via conduit 28. The wellhead separator 20 may be any conventional gas-liquid separator.

An oxidizing agent is added to the produced geothermal fluid in conduit 14 via conduit 18 prior to entry of the fluid into the first wellhead separator 20. This oxidizing agent can be added to the fluid by any suitable means such as, for example, by injecting the oxidizing agent through an injection nozzle (or plurality thereof) which extends into the conduit transporting the fluid from the wellhead to the first wellhead separator. Gaseous oxygen is the preferred oxidizing agent since it has been found to preferentially oxidize the sulfide content of the geothermal brine. Any available source of gaseous oxygen, such as air or commercially available tonnage oxygen, may be utilized in the process of the present invention, although air is the preferred source of gaseos oxygen due to its low cost and availability. Not only does air oxidize a substantial amount of the sulfides which are present in geothermal brines as compared to other oxidants, but also air engages in fewer competitive reactions with, for example, iron, thereby insuring that a substantial portion of the air injected oxidizes the sulfides present in the brine.

In the following Example 1, the relative effectiveness of various oxidants in oxidizing sulfides present in brine are tested. As the Example is illustrative only, it is not intended to be construed as limiting the scope of the invention as defined by the claims.

EXAMPLE 1

Geothermal fluid containing about 54 ppm of hydrogen sulfide and about 5,200 ppm of calcium in the liquid phase is produced from a subterranean geothermal reservoir and is degassed at the wellhead utilizing a 360° loop of 4-inch pipe which acts as a centrifugal separator for gas and liquid. Vapor and liquid entrained therein are withdrawn from the inner surface of this loop. The liquid is separated from the vapor in a conventional gas liquid separator and combined with the main brine stream in a 10-inch header. The degassed brine contains dissolved hydrogen sulfide and heavy metals, such as lead and zinc, which would form heavy metal sulfide scale if the brine were subsequently depressurized and cooled.

Three runs using different oxidants, i.e., air, hydrogen peroxide and sodium hypochlorite, are made to determine the relative effectiveness of the oxidants in oxidizing the sulfide content of the degassed brine. The oxidants are injected into the brine at the 10-inch header and are mixed with the brine by means of the turbulence in the header. The brine is thereafter sent to a second larger separator where steam is flashed and vented, and the residual brine is reinjected into a well communicating with the subterranean geothermal reservoir. The results are reported in Table 2.

TABLE 2

| Oxidant | Air | H$_2$O$_2$ | NaOCl |
|---|---|---|---|
| Oxidant Rate, (cfm) gph | (5.1)$^a$ | 73 | 73 |
| Solution Concentration, wt. % | — | 1.7 | 3.7 |
| Steam Rate, Lbs/Hr | 15,385 | 17,887 | 13,607 |
| H$_2$S Balance | | | |
| Baseline H$_2$S, Lbs/Hr | 2.46 | 3.37 | 2.25 |
| H$_2$S in Steam, Lbs/Hr | 0.71 | 2.20 | 2.04 |
| H$_2$S Oxidized, Lbs/Hr | 1.75 | 1.17 | 0.21 |
| H$_2$S Oxidized, % | 71.1 | 34.7 | 9.3 |
| Oxidant Balance | | | |
| Oxidant Injected, Lbs/Hr | 4.66 | 10.3 | — |
| O$_2$ in Steam, Lbs/Hr | 1.75 | 0.89 | — |
| Oxidant Consumed, Lbs/Hr | 3.91 | 9.41 | — |
| Oxidant Consumed, % | 69.0 | 91.4 | — |
| Oxidant/H$_2$S Mole Ratio$^b$ | 2.37 | 8.04 | — |

$^a$Calculated flow rate based on the amount of nitrogen in the later separated gases.
$^b$Ratio of oxidant consumed to H$_2$S reacted, moles O$_2$/mole H$_2$S.

As is evident from the foregoing results, air is clearly the preferred oxidant in terms of performance, in addition to availability and cost. The other oxidants tested, hydrogen peroxide and sodium hypochlorite, performed poorly as an oxidant for hydrogen sulfide. This result is believed due to the fact that both hydrogen peroxide and sodium hypochlorite preferentially react with ferrous ions present in the brine and not with the hydrogen sulfide.

The sulfide present as hydrogen sulfide in the produced geothermal fluid is oxidized by the addition of gaseous oxygen thereto in accordance with the following set of reactions:

$$H_2S + \tfrac{1}{2}O_2 \rightleftarrows S + H_2O \quad (1)$$

$$H_2S + O_2 \rightleftarrows \tfrac{1}{2}S_2O_3^{--} + H^+ + \tfrac{1}{2}H_2O \quad (2)$$

$$H_2S + 3/2O_2 \rightleftarrows SO_3^{--} + 2H^+ \quad (3)$$

$$H_2S + 2O_2 \rightleftarrows SO_4^{--} + 2H^+ \quad (4)$$

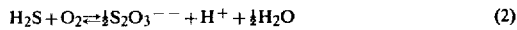

In addition to these rather simple sulfur compounds, a smaller quantity of more complex sulfur compounds, such as polythionates, an example of which is tetrathionate (S$_4$O$_6^{--}$), are formed. Further, these sulfur compounds which are formed will to a small extent react with each other.

If complete oxidation of sulfide is achieved, sulfate is formed in accordance with reaction (4) and will combine with barium ions present in the brine to form barium sulfate, an insoluble precipitate. If barium sulfate deposition is uncontrolled, it will quickly scale process piping and equipment and will rapidly plug the same. Therefore, it is desirable to oxidize sulfides to intermediate sulfide oxidation products as represented by reactions (1) through (3), and it is preferred to oxidize the sulfides to thiosulfate, a water-soluble compound, per reaction (2).

In the method of this invention, the hydrogen sulfide in the geothermal fluid is selectively oxidized such that the oxidized hydrogen sulfide is substantially completely converted to sulfur and/or sulfur-containing compounds in which the sulfur has a valence less than plus six, i.e., some intermediate sulfur oxidation state less than sulfate. Generally a mixture of sulfide oxidation products will result, however in following the method of this invention the brine remaining after oxidation will be substantially free of sulfide and sulfate ions and no significant amount of sulfate scale will have been formed in the process.

While the prior art teaches that partial oxidation of hydrogen sulfide to intermediate sulfide oxidation products less than sulfate cannot be achieved in a geothermal brine, I have discovered that such partial oxidation is in fact possible when the geothermal brine contains at least a critical minimum amount of calcium ions and a critical amount of oxygen is injected to react with the hydrogen sulfide.

The minimum calcium concentration required to inhibit complete oxidation of the hydrogen sulfide to a sulfate will depend primarily upon the amount of hydrogen sulfide present in the produced geothermal fluid. It is presently believed that at least about 10 moles of calcium ion is required for each mole of hydrogen sulfide. As a practical matter, the brine should contain on the order of at least about 50 moles of calcium ion per mole of hydrogen sulfide. Many produced geothermal fluids have sufficient calcium concentrations. Where the geothermal fluid does not contain sufficient calcium, a source of calcium ions is preferably added to the fluid to establish the critical minimum calcium concentration prior to the partial oxidation step. For example as shown in the drawing a concentrated aqueous calcium chloride solution may be added to the produced fluid through conduit 30 at a point upstream of the oxidant injection point. For a produced geothermal fluid containing about 50 ppm of hydrogen sulfide, the liquid phase should preferably contain at least about 1000 ppm, more preferably at least about 5000 ppm of calcium ions in order to successfully inhibit sulfate formation. Good results are achieved in using the method of this invention to treat a geothermal brine containing about 50 ppm of hydrogen sulfide and about 5,200 ppm of calcium ions.

Although not fully understood, it is believed that the calcium ions in the fluid tend to form relatively stable complexes with the intermediate sulfide oxidation products, such as bisulfite ions and thiosulfate ions, which complexes serve to inhibit further oxidation of these intermediate products to sulfate species. In any case, this complete-oxidation-inhibiting effect of the calcium ions observed in a field test is substantial. The calcium ions appear to regulate the oxidation process so that the hydrogen sulfide is more uniformly oxidized to the intermediate sulfide oxidation products, rather than having a large fraction of the hydrogen sulfide oxidized fully to sulfate species as has reportedly occurred in calcium-free, simulated geothermal brines.

The amount of oxygen injected into the produced geothermal fluid is also critical. An excess of oxygen will overcome the beneficial effect of the calcium ions resulting in the formation of sulfate anions and hence barium sulfate precipitates. To accomplish the desired intermediate oxidation, it has been determined that from about 0.75 to about 1.75, preferably from about 1 to about 1.5, moles of oxygen should be injected per mole of hydrogen sulfide present in the produced geothermal fluid. Utilizing the critical 0.75 to 1.75 molar ratio, the majority of the sulfide present in the brine is oxidized to bisulfite and thiosulfate, as discussed above. Sulfur and sulfate are also formed to a much lesser degree, with the amount of barium sulfate formed being sufficiently small to be soluble in the produced geothermal brine. Also, utilizing the preferred molar ratio of 1 to 1.5 moles of oxygen injected per mole of hydrogen sulfide in the geothermal fluid, a corresponding ratio of 1.5 of 2 moles of oxygen consumed per mole of hydrogen sulfide consumed should result. In other words, most of the oxygen will be preferentially consumed in the reaction with hydrogen sulfide with a smaller amount being consumed in peripheral reactions, such as that with ferrous ions present in the brine.

The oxidant, i.e., air, should be injected into the produced geothermal fluid prior to entry of the fluid into any wellhead separator in order to oxidize the hydrogen sulfide in the fluid before a pressure reduction causes the precipitation of heavy and/or transition metal sulfides. The oxidant in any event should not be injected into the degassed brine drawn off the bottom of the wellhead separator. Although the degassed brine contains only a relatively small amount of hydrogen sulfide as compared to the produced geothermal fluid (5 wppm as compared to 50 wppm), injection of air into the degassed brine creates a corrosive fluid environment in addition to oxidizing the sulfide present therein. A degassed brine which has been oxidized by air typically contains a significant amount of ferric ions which are highly corrosive. It is believed that at the relatively low concentration of hydrogen sulfide in the degassed brine (achieving 90% sulfide removal in the wellhead separator provides a tenfold decrease in sulfide concentration, as noted supra), the ferrous ions present in the brine are able to compete with the relatively low concentration of sulfide ions for reaction with the oxygen in the air. As a result a relatively large amount of ferrous ions are oxidized to ferric ions creating an excessively corrosive environment. On the other hand, if air is injected into the fluid prior to entry thereof into the wellhead separator, the sulfide concentration in the fluid is still sufficiently large (e.g., 50 wppm) to allow the oxygen injected to preferentially react therewith and only a relatively small amount of ferrous ions are oxidized to ferric. The following Example 2 is illustrative of oxidizing the hydrogen sulfide content of geothermal fluid prior to wellhead separators in accordance with the present invention. Since this example is illustrative only, it is not intended to be construed as limiting the scope of the invention as defined by the claims.

EXAMPLE 2

In an initial test, hydrogen sulfide present in a geothermal fluid produced from a subterranean reservoir is oxidized by injecting air into the fluid prior to entry thereof into a wellhead separator. The fluid contains about 5200 ppm of calcium. The air is injected into the flow line through which the geothermal fluid is transported at a point upstream of five restriction orifices. The amount of air injected is limited to that amount which would approximate 1 mole of oxygen injected in the air per 1 mole of hydrogen sulfide contained in the produced fluid. After oxidation, the fluid is passed to a high pressure separator where non-condensible gases and steam are removed from the brine and analyzed to determine the hydrogen sulfide and oxygen content thereof. The oxygen content is measured by utilizing a gas chromatograph and the hydrogen sulfide content is determined by Drager tube analysis and by passing a sample of the fluid to be tested through a solution of cadmium sulfate and titrating the cadmium sulfide formed with iodine. The air injection rate is measured utilizing an orifice meter. The well flow rate is limited to 160,000 lb/hr by a restriction orifice at the wellhead. The results of this test are reported in Table 3.

TABLE 3

| | Hydrogen Sulfide | | | | Oxygen (in Air) | | | | Mole Ratio | |
|---|---|---|---|---|---|---|---|---|---|---|
| Day | Produced Lb/Hr | In Steam Lb/Hr | Consumed Lb/Hr | % | Injected Lb/Hr | In Steam Lb/Hr | Consumed Lb/Hr | % | $O_2/H_2S$ Injected Produced In Fluid | $O_2/H_2S$ Consumed |
| 1 | 8.17 | 2.97 | 5.20 | 63.6 | 6.14 | 0.614 | 5.53 | 90.1 | 0.8 | 1.13 |
| 2 | 8.52 | 3.11 | 5.41 | 63.5 | 6.13 | 0.545 | 5.59 | 91.2 | 0.76 | 1.10 |
| 3 | 8.29 | 4.10 | 4.19 | 50.5 | 6.57 | 0.536 | 6.03 | 91.8 | 0.84 | 1.53 |
| 4 | 7.74 | 2.68 | 4.79 | 64.1 | 6.03 | 0.536 | 5.49 | 91 | 0.86 | 1.22 |
| 5 | 7.31 | 3.67 | 3.64 | 49.8 | 6.02 | 0.459 | 5.56 | 92.4 | 0.87 | 1.62 |
| 6 | 7.26 | 4.08 | 3.18 | 43.8 | 6.73 | 0.573 | 6.16 | 91.5 | 0.99 | 2.06 |
| 7 | 7.03 | 2.46 | 4.57 | 65.0 | 4.54 | 0.484 | 4.06 | 89.4 | 0.67 | 0.94 |

Another field test is conducted wherein produced geothermal fluid containing about 54 ppm of hydrogen sulfide and about 5,200 ppm of calcium is passed through a first wellhead separator, which separation removes approximately 87% of the hydrogen sulfide from the brine. Air is injected into the residual brine which is lean in hydrogen sulfide by means of an injection nozzle and subsequent mixing was provided either by a static mixer or a plurality of orifices. Flow rates of brine and air are determined by utilizing metering orifices. Hydrogen sulfide and oxygen content analysis are conducted as previously described. The results obtained are reported in the following Table No. 4.

TABLE 4

| | Hydrogen Sulfide | | | Oxygen | | | Mole Ratio | |
|---|---|---|---|---|---|---|---|---|
| Day | In Lean Brine Lb/Hr | Consumed Lb/Hr | % | Injected Lb/Hr | Consumed Lb/Hr | % | $O_2$ Injected/ $H_2S$ in Lean Brine | $O_2/H_2S$ Consumed |
| 1 | 0.19 | 0.097 | 52 | 0.39 | 0.29 | 74 | 2.2 | 3.1 |
| 2 | 0.21 | 0.10 | 49 | 0.20 | 0.16 | 81 | 1.0 | 1.6 |
| 3 | 0.19 | 0.094 | 50 | 0.24 | 0.22 | 92 | 1.34 | 2.5 |
| 4 | 0.25 | 0.20 | 80 | 1.72 | 1.58 | 92 | 7.1 | 8.4 |
| 5 | 0.18 | 0.098 | 54 | 0.44 | 0.41 | 93 | 1.1 | 4.4 |
| 6 | 0.30 | 0.19 | 64 | 0.29 | 0.27 | 94 | 1.0 | 1.5 |
| 7 | 0.20 | 0.085 | 42 | 0.29 | 0.079 | 27 | 1.54 | 0.99 |
| 8 | 0.20 | 0.11 | 57 | 0.29 | 0.22 | 75 | 1.54 | 2.0 |
| 9 | 0.26 | 0.14 | 54 | 0.39 | 0.35 | 89 | 1.6 | 2.6 |

As previously noted, to achieve intermediate oxidation of the sulfides, it is preferred to inject from about 1 to about 1.5 moles of gaseous oxygen in air per mole of hydrogen sulfide in the brine being treated. In doing so, about 1.5 to about 2 moles of oxygen will be consumed per mole of hydrogen sulfide converted since some of the oxygen will be consumed in peripheral reactions which occur to a lesser extent than that with hydrogen sulfide, e.g., reaction with ferrous ions in the brine. As is evident from the data in Table 3, when air is injected into the produced brine before entry of the brine into the wellhead separator, the molar ratios of oxygen and hydrogen sulfide consumed are within the molar ratio ranges just discussed. Therefore, it can be deduced that oxygen present in the injected air is preferentially reacting with hydrogen sulfide. In contrast, the data in Table 4 evidences that when air is injected into low hydrogen sulfide content degassed brine, the molar ratio of oxygen consumed per hydrogen sulfide consumed is relatively high, i.e., 2-4. This indicates that oxygen in the air is not preferentially reacting with hydrogen sulfide but is competitively reacting with ferrous ions in the brine. This is substantiated by the fact that the degassed brine oxidized in the latter test was visually observed to be of a rusty, pink-toned color thereby indicating the presence of ferric ions. This is suprising since the skilled artisan would be led to believe that the degassed brine stream having the lower hydrogen sulfide concentration would be more easily oxidized. A relatively small amount of ferric ion in the brine can be tolerated without excessive corrosion of the process piping and equipment, but the relatively large amounts formed in the degassed brine cannot be tolerated. As an example, in the latter test $\frac{1}{8}$-inch loss on a conduit havng $\frac{1}{2}$-inch wall thickness is measured in the span of about 5 days total exposure to the brine.

Since air is highly corrosive to the process piping and equipment utilized in the process of the present invention, the portion of the process piping and equipment which air contacts should be constructed of an alloy metal which is resistant to such corrosion or should be coated with a corrosion resistant material. An example of a suitable alloy is a titanium alloy, and a suitable corrosion resistant coating is CorReco 700, a phenol mercaptide, marketed by Corrosion Research Company. In light of the fact that a substantial portion of the air injected during the process described herein is removed from the geothermal brine in the first wellhead separator along with steam and other non-condensibles, normally it will be sufficient to construct only the wellhead separator and production piping and equipment leading thereto with such a corrosion resistant alloy. The extent to which process piping and equipment will have to be so constructed will be evident to the skilled artisan cognizant of oxygen concentration throughout the process flow scheme.

In addition to the critical parameters of oxygen to hydrogen sulfide molar ratio and calcium concentration, the degree of turbulence induced in the two-phase geothermal fluid during the oxidation process can also be critical, depending primarily on the concentration of iron in the geothermal brine. Where the liquid phase of the geothermal fluid is substantially free of iron, the degree of turbulence is not deemed critical. Thus mixing devices such as restriction orifice plates, static mixers, packed columns, etc. are believed suitable for mixing the gaseous oxygen with a geothermal fluid which is substantially free of iron.

However, where the geothermal brine contains about 1 ppm or more of iron care must be taken to insure against intense mixing of the two-phase fluid before the hydrogen sulfide has been oxidized by the method of this invention. Intense mixing of the two-phase fluid during oxidation of the hydrogen sulfide typically results in the formation of iron pyrites which rapidly scale the process piping and equipment. Presumably the intense mixing results in a formation of ferric ions and elemental suflur which in turn react with additional hydrogen sulfide absorbed from the gaseous phase to form the iron pyrites.

The intense mixing caused by flowing air and an iron-containing, two-phase fluid through even a relatively short static mixer typically results in a rapid plugging of the static mixer with iron pyrites. Since a lesser amount of mixing is necessary to insure that the maximum sulfide oxidation occurs, it has been determined that iron pyrites will not form when a plurality of orifice plates (e.g., 3 or 4 orifices each creating 5 psig pressure drop) or elbows in the process piping after the point of injection of the oxidant into the brine are utilized to mix the two phases. Preferably the amount of mixing in such a case is controlled by injecting the oxygen into a conduit conducting two-phase geothermal fluid to the wellhead separator and passing the combined fluid through between about 2 and about 5 restriction orofices each of which causes about a 5 p.s.i. pressure drop in the fluid. Of course, other mixing devices which cause about this same degree of turbulence will also be suitable.

After the geothermal fluid has passed through the wellhead separator 20, the brine in conduit 28 can be processed and/or useful energy can be derived therefrom by a known means in any conventional manner known to the skilled artisan. Thus, the process of the present invention is not restricted to use in conjunction with any particular means or manner of processing or deriving energy from the geothermal fluid.

Even though the present invention has been described in terms of a process for oxidizing hydrogen sulfide present in a geothermal fluid which contains barium and heavy and/or transition metal ions in solution, the process of the present invention is not limited in application to geothermal fluids but may be applicable to any hot fluid containing hydrogen sulfide and having calcium, barium and heavy and/or transition metal ions in solution.

While various embodiments and modifications of this invention have been described in the foregoing description, further modifications will be apparent to those skilled in the art. Such modifications are included within the scope of the present invention as defined by the following claims.

Having now described the invention, I claim:

1. A method for preventing scale deposition from a hydrogen sulfide-containing, two-phase geothermal fluid, comprising:
   (a) flowing from a subterranean formation through a well to the earth surface a hot two-phase geothermal fluid comprised of (1) a hydrogen sulfide-containing vapor phase and (2) a liquid phase contaning dissolved hydrogen sulfide, dissolved barium and dissolved heavy and/or transition metals;
   (b) injecting into the geothermal fluid which also contains at least about 10 moles of dissolved calcium per mole of hydrogen sulfide a gas comprised of oxygen at a rate sufficient to provide therein an oxygen to hydrogen sulfide molar ratio between about 0.75 and about 1.75, and mixing said gas with said geothermal fluid so as to selectively oxidize said hydrogen sulfide to sulfur and/or water soluble sulfide oxidation products wherein the sulfur has a valence less than plus six; and (c) thereafter separating said two-phase geothermal fluid into (1) a gaseous phase comprised of steam and noncondensible gases and (2) a hot brine containing said sulfur and/or water-soluble sulfide oxidation products.

2. The method defined in claim 1 wherein said gas is injected at a rate selected to provide an oxygen to hydrogen sulfide molar ratio between about 1.0 and about 1.5 in said two-phase geothermal fluid.

3. The method defined in claim 1 wherein said hydrogen sulfide is oxidized in step (b) to water-soluble sulfide oxidation products consisting essentially of thiosulfate anions, bisulfite anions and polythionate anions.

4. The method defined in claim 1 wherein said gas is air.

5. The method defined in claim 1 wherein said liquid phase contains at least about 50 moles of dissolved calcium per mole of hydrogen sulfide in said two-phase geothermal fluid.

6. The method defined in claim 1 wherein said liquid phase contains at least about 1000 ppm of dissolved calcium.

7. The method defined in claim 1 wherein said liquid phase contains at least about 1 ppm of dissolved iron, and wherein said method further comprises the step of selectively controlling the degree of turbulence during the mixing of said gas and said two-phase geothermal fluid so as to avoid the formation of iron pyrites.

8. The method defined in claim 7 wherein said gas is injected into a conduit conducting said two-phase geothermal fluid from the well to a wellhead separator and wherein the mixing of said gas and said geothermal fluid is controlled by passing the combined fluids through a plurality of restriction orifices mounted in said conduit each of which orifices induces a pressure drop of about 5 p.s.i. on the combined fluid flowing therethrough.

9. The method defined in claim 1 wherein the geothermal fluid produced from said subterranean formation contains less than about 10 moles of dissolved calcium per mole of hydrogen sulfide, and wherein said method further comprises the step of adding a source of calcium ions to said geothermal fluid prior to step (b) to thereby increase the calcium ion concentration of said liquid phase to at least about 10 moles of dissolved calcium per mole of hydrogen sulfide in said geothermal fluid.

10. A method for preventing scale deposition from a hydrogen sulfide-containing, two-phase geothermal fluid, comprising:

(a) flowing through a conduit and into a gas/liquid separator a hot two-phase geothermal fluid comprised of (1) a hydrogen sulfide-containing vapor phase and (2) a liquid phase containing dissolved hydrogen sulfide, dissolved barium, dissolved heavy and/or transition metals and at least about 1,000 ppm of dissolved calcium, said calcium comprising at least about 10 moles of dissolved calcium per mole of hydrogen sulfide in said geothermal fluid;

(b) injecting into said geothermal fluid flowing through said conduit a gas comprised of oxygen at a rate selected to provide therein an oxygen to hydrogen sulfide molar ratio between about 0.75 and about 1.75;

(c) mixing said gas with said geothermal fluid in said conduit so as to selectively oxidize said hydrogen sulfide to water-soluble intermediate sulfide oxidation products consisting essentially of thiosulfate anions, bisulfite anions and polythionate anions; and (d) thereafter separating said two-phase geothermal fluid in said gas/liquid separator into (1) a gaseous phase comprised of steam and noncondensible gases and (2) a hot brine containing said oxidation products.

11. The method defined in claim 10 wherein said gas is air, and said heavy and/or transition metals are manganese, iron, copper, silver, lead and/or zinc.

12. The method defined in claim 10 wherein said liquid phase contains at least about 1 ppm of dissolved iron and wherein, during step (c), the degree of turbulence caused by said mixing is selectively controlled to avoid the formation of iron pyrites.

13. The method defined in claim 12 wherein said mixing is provided by flowing said gas and said geothermal fluid through a plurality of restriction orifices mounted in said conduit.

14. A method for preventing scale deposition from a hydrogen sulfide-containing, two-phase geothermal fluid, comprising:

(a) flowing from a subterranean geothermal reservoir through a well to the earth surface a hot two-phase geothermal fluid comprised of (1) a hydrogen sulfide-containing vapor phase and (2) a liquid phase containing dissolved hydrogen sulfide, dissolved barium, dissolved iron, dissolved heavy and/or transition metals and at least about 5,000 ppm of dissolved calcium, said calcium comprising at least about 50 moles of dissolved calcium per mole of hydrogen sulfide in said geothermal fluid;

(b) flowing said geothermal fluid through a conduit containing between about 2 and about 5 restriction orifices and into a gas/liquid separator, each of said orifices being sized to induce about a 5 p.s.i. drop in the pressure of the fluid flowing therethrough;

(c) injecting air into said geothermal fluid through at least one injection nozzle mounted in said conduit so as to discharge said air into said geothermal fluid at a point upstream of said restriction orifices, said air being injected at a rate selected to provide therein an oxygen to hydrogen sulfide molar ratio between about 1.0 and about 1.5, whereby in flowing through the restriction orifices in said conduit said air is mixed with said geothermal fluid so as to selectively oxidize said hydrogen sulfide to water-soluble sulfide oxidation products consisting essentially of thiosulfate anions, bisulfite anions and polythionate anions; and (d) thereafter separating said two-phase geothermal fluid in said gas/liquid separator into (1) a gaseous phase comprised of steam and noncondensible gases and (2) a hot brine containing said oxidation products.

* * * * *